United States Patent [19]

Avaro et al.

[11] 4,042,771

[45] Aug. 16, 1977

[54] POLYMERIZATION OF OLEFINS WITH PRE-ACTIVATED CATALYSTS

[75] Inventors: Michel Avaro; Pierre Mangin, both of Martigues, France

[73] Assignee: Naphtachimie, Paris, France

[21] Appl. No.: 614,501

[22] Filed: Sept. 18, 1975

Related U.S. Application Data

[63] Continuation of Ser. No. 398,161, Sept. 17, 1973, abandoned.

[51] Int. Cl.$^2$ .................... C08F 210/00; C08F 212/00
[52] U.S. Cl. .................................. 526/124; 526/348; 526/350; 526/351; 526/352
[58] Field of Search ............... 260/88.2; 526/110, 116, 526/144, 172, 348, 916, 151, 348, 350, 351, 352, 124

[56] References Cited

U.S. PATENT DOCUMENTS

| | | | |
|---|---|---|---|
| 2,927,105 | 3/1960 | Nienburg et al. | 260/94.9 |
| 3,101,328 | 8/1963 | Edmonds | 260/93.7 |
| 3,392,159 | 7/1968 | Schooley | 260/93.7 |
| 3,562,239 | 2/1971 | de Jong et al. | 260/93.7 |

FOREIGN PATENT DOCUMENTS 1,299,862  0000  United Kingdom

OTHER PUBLICATIONS

Doak et al., in "Crystalline Olefin Polymer", Part I, (Interscience, New York, 1965), pp. 366–371.

*Primary Examiner*—Joseph L. Schofer
*Assistant Examiner*—A. L. Clingman

[57] ABSTRACT

A method for the polymerization of olefins using a catalyst in the form of a solid compound of a transition metal in which the transition metal is at least partially reduced to a valency state lower than the maximum valency state, with the transition metal compound being subjected prior to use to pre-activation by contact with magnesium and one or more halogenated hydrocarbons and one or more organo-metallic compounds of Groups II and III.

18 Claims, No Drawings

POLYMERIZATION OF OLEFINS WITH PRE-ACTIVATED CATALYSTS

This is a continuation of application Ser. No. 398,161 filed Sept. 17, 1973, now abandoned.

The invention relates to a method of polymerizing olefins in the presence of solid catalysts which essentially comprise transition metal compounds which are subjected, before the polymerization operation, to a so-called pre-activation treatment by means of magnesium and monohalogenated hydrocarbons. This method can be performed at relatively low pressures, generally lower than 25 bars, in the polymerization or copolymerization of olefins having the formula $CH_2=CHR$ in which R is a hydrogen atom or an alkyl radical having a maximum of 8 carbon atoms. This method is of particular advantage for the polymerization of ethylene to polymers having a means molecular weight of more than 50,000 and a high degree of crystallinity. It can also be used for the polymerization of propylene in the form of waxes having a low degree of crystallinity.

It is known that olefins such as ethylene can be polymerized by means of a solid catalyst which comprises a compound of a transition metal such as titanium in the trivalent state, associated with a co-catalyst of the organo-metallic type, most frequently an organo-aluminum compound. These solid catalysts are produced by reducing transition metal compounds in which the metals are at least in the tetravalent state, which reduction operation can be effected for example by means of organo-aluminum compounds.

Although the catalytic systems thus formed have an attractive degree of activity, when polymerization is concluded the generally result in the formation of polymers containing more than 100 parts by weight per million of transition metal. For most of the uses of such polymers, this makes it virtually necessary to remove the catalytic residues by a special treatment.

It has been found that it is possible to very substantially increase the catalytic activity of the above mentioned reduced transition metal compounds by means of a preactivation treatment. The reduced transition metal compounds which are pre-activated by this treatment result in polymers having good physical characteristics and capable of being processed by injection or by extrusion. By virtue of the high degree of activity of the pre-activated catalysts according to the invention, the operation of removing the catalytic residues contained in the polymers becomes unnecessary.

The invention therefore relates to a method of polymerizing olefins at a low pressure in the presence of a catalytic system which comprises, as a catalyst, a solid compound of a transition metal of sub-groups IVa, Va, or VIa of the Periodic Table of elements, in which compound the transition metal is at least in part in a valency state lower than the maximum, the solid compound of the transition metal being subjected before polymerization to a pre-activation treatment by being brought into contact with magnesium and one or more monohalogenated hydrocarbons, and, as a co-catalyst, one or more organo-metallic compounds of the metals of groups II and III of the Periodic Table of elements.

The transition metals of sub-groups IVa, Va and VIa of the Periodic Table of elements, as referred to in the preceding paragraph, comprise titanium, vanadium, chromium, zirconium, niobium, hafnium, tantalum, tungsten, thorium and uranium.

The solid transition metal compound is preferably selected from compounds of trivalent titanium corresponding to the formula $Ti(OR)_m X_{3-m}'$ in which R represents an alkyl radical which can contain from 2 to 8 carbon atoms, X represents a halogen, generally chlorine, and m represents an integer or a fraction which can be of any value between 0 and 3. These trivalent titanium compounds are advantageously prepared by the reduction, by means of organo-metallic compounds such as organo-aluminic compounds, of compounds having the formula $Ti(OR)_p X_{4-p}'$ in which R represents an alkyl radical which can contain from 2 to 8 carbon atoms, X represents a halogen atom, generally chlorine, and p represents an integer or a fraction which can be of any value between 0 and 4. Thus, these tetravalent titanium compounds can be selected from titanium tetrachloride, an alkyl tetratitanate or an alkyl chlorotitanate produced from calculated amounts of a titanium tetrahalide having the formula $TiX_4$, and an alkyl tetratitanate having the formula $Ti(OR)_4$, in accordance with a functional interchange reaction which can be written as follows:

$$(4-p/4)\ TiX_4 + (p/4)Ti(OR)_4 \rightarrow Ti(OR)_p X_{4-p}$$

The solid compound of a transition metal can also be selected from vanadium trihalides such as vanadium trichloride or vanadium tribromide.

The monohalogenated hydrocarbons are preferably selected from chlorinated or brominated derivatives of saturated aliphatic hydrocarbons; they then correspond to the general formula $C_y H_{2y+1} X$, in which formula X represents a chlorine or bromine atom and y represents an integer between 1 and 12. The monohalogenated hydrocarbons can also be selected from cyclic derivatives or aromatic derivatives, (i.e., cycloalkyl and aromatic halides).

The magnesium is preferably formed by magnesium in a high state of purity, used in the form of powder or turnings. In order to facilitate pre-activation of the solid transition metal compounds, the magnesium is used in a reactive form, that is to say, in a form which is substantially devoid of impurities due in particular to oxidation of the metal. In practice, the magnesium which is currently available in the industry is activated before being introduced into the medium in which pre-activation is effected, or within said medium itself. Previous activation of the magnesium can, for example, comprise grinding the metal in an inert atmosphere or in an inert liquid such as an aliphatic solvent; this preliminary operation can also be effected by treating magnesium with iodine vapor. It is more convenient however to activated the magnesium within the medium in which pre-activation is effected, for example, by introducing into the medium moderate amounts of substances such as iodine or electron-donor compounds such as alcoholates of metals of sub-groups Ia, IIa and IIIa of the Periodic Table of elements, alkyl titanates or ethers, in particular ethoxy-ethane.

Pre-activation of the solid transition metal compound by means of magnesium and monohalogenated hydrocarbons is preferably effected in an inert solvent such as a saturated hydrocarbon or a mixture of saturated hydrocarbons, and at a temperature which is generally from −20° to 150° C and preferably from 0° to 100° C. It is of advantage for the solvent to be agitated during this operation in order to improve the contact between the monohalogenated hydrocarbon or hydrocarbons dissolved in the solvent, the solid transition metal compound and the magnesium, also in the solid state.

In order to obtain, by preactivation, catalysts having a high degree of activity and leading to polymers having satisfactory properties, it is recommended that the relative amounts of the reactants used be such that:

- the ratio between the number of molecules of monohalogenated hydrocarbons and the number of magnesium atoms is from 0.5 to 10 and preferably from 1 to 4.
- the ratio between the number of molecules of the solid transition metal compound and the number of magnesium atoms is from 0.1 to 10 and preferably from 0.25 to 2.

It has been observed that the effect of pre-activation of the catalysts was not obtained immediately; a contact time of the reactants of from 30 minutes to 3 hours generally results in a maximum increase in the activity of the catalyst. Treatment over a longer period, which can be up to several days, no longer substantially increases the degree of activity.

The solid transition metal compound can then be separated from the medium in which it was pre-activated, and then washed with a solvent such as an aliphatic hydrocarbon, until virtually all the halogenated compound or compounds in the washing solvent has or have disappeared. It can then be isolated and dried or preserved in suspension in some solvent, protected from air or humidity.

The pre-activated solid transition metal compound is used in the polymerization of olefins in the presence of one or more co-catalysts selected from organo-metallic compounds of the metals of groups II and III of the Periodic Table of elements, and in particular from organo-aluminum compounds having the mean formula $AlR_nX_{3-n}$ in which R represents an alkyl groups which preferably contains from 2 to 8 carbon atoms, which alkyl group can in part be substitued by hydrogen, X represents a halogen, preferably chlorine, and n represents an integer or a fraction which can be of any value between 1 and 3. The co-catalyst is advantageously used in amounts such that the atomic ratio between the aluminum of the co-catalyst and the transition metal of groups IVa, Va and VIa of the catalyst, is from 1 to 50.

Polymerization of the olefins can be carried out in a liquid medium, in particular in a solvent such as a saturated hydrocarbon or a mixture of saturated hydrocarbons in which the polymer formed is in suspension or in solution. This operation can also be carried out in the absence of any liquid medium, for example in a fluidized bed reaction vessel.

In both cases, polymerization is effected at a pressure which is generally lower than 25 bars and at a temperature which is from 40 to 150° C. During the polymerization operation, it is possible to act on the mean molecular weight of the polymer formed by means of a chain-limiter such as hydrogen which is introduced in molecular proportions which are, for example, from 5% to 80% with respect to the olefin to be polymerized.

Polymerization is stopped when the polymer reaches the desired mean molecular weight, which is generally from 10,000 to 1,000,000. Because of the high degree of activity of the pre-activated catalysts in accordance with the invention, the polymers produced generally contain less than 100 and even less than 50 ppm of transition metal. These polymers can therefore be put into use without the necessity for them to be subjected to a purification treatment.

In the particular case in which it is desired to produce polyolefin waxes having a low degree of crystallinity, it is advantageous to polymerize in accordance with the invention, propylene to which there may possibly be added one or more other olefins having the formula $CH_2=CHR'$ in which R' is hydrogen or an alkyl radical containing from 2 to 8 carbon atoms, the polymerization operation being carried out in the presence of a catalytic system which comprises:

On the one hand, as a catalyst, a compound of trivalent titanium having the formula $Ti(OR)_mX_{3-m}$ in which R represents an alkyl radical which can contain from 2 to 8 carbon atoms, X represents a halogen atom, generally chlorine, and m represents a fraction which can be of any value between 0 and 0.5, which trivalent titanium compound can be subjected before polymerization to a pre-activation treatment by being brought into contact with magnesium and one or more monohalogenated hydrocarbons; and, on the other hand, as a co-catalyst, one or more organo-metallic compounds of the metals of Group II and III of the Periodic Table of elements.

The trivalent titanium compound which is subjected to the pre-activation operation advantageously comprises a titanium trihalide, preferably titanium trichloride, which is prepared by a reduction of a titanium tetrahlide by means of organo-metallic compounds such as organo-aluminic compounds.

The amount of catalyst used is such that the concentration in the reaction medium of the titanium compound is advantageously from 1 to 5 millimoles per liter of reaction medium. The co-catalyst is introduced in amounts such that the atomic ratio between the metal of the co-catalyst and the titanium of the catalyst is advantageously from 1 to 10 and preferably from 2 to 5.

Polymerization is preferably effected in a saturated hydrocarbon solvent comprising one or more hydrocarbons such as petroleum solvents, which are liquid under the conditions of the polymerization operation. Paraffinic hydrocarbons such as n-heptane or petroleum cuts which essentially comprise paraffins having from 6 to 8 carbon atoms, are particularly suitable as they are good solvents in repsect of polyolefin waxes.

Polymerization is effected at a pressure which is generally less than 25 bars and at a temperature of from 40° to 150° C and preferably from 70° to 90° C. When polymerization of the propylene is carried out in the presence of one or more other olefins, it is possible to introduce into the reaction vessel either a mixture, of constant composition, of propylene and the other olefin or olefins, or to vary the composition of the mixture in the course of the polymerization operation. It is possible to act on the mean molecular weight of the polymer formed, on the one hand by varying the concentration of catalytic substances in the solvent and on the other hand by using, during the polymerization operation, a chain-limiter such as hydrogen, which is introduced into the reaction medium in molecular proportions, relative to the olefins to be polymerized, of from 5% to 80%. Using a chain-limiter is particularly recommended when polymerization is effected solely with propylene; on the other hand, when polymerization is carried out with propylene accompanied by other olefins, smaller amounts of chain-limiter are necessary, the presence of olefins other than propylene promoting chain-limitation.

In order to facilitate agitation during the polymerization operation, it is preferable not to exceed a wax concentration in the reaction solvent of the order of 500g/1 of solvent.

At least a large part of the polymers produced are dissolved in the hot polymerization solvent. If necessary, the solution produced is filtered, so as to remove the insoluble crystalline polymers, then the solvent is separated from the waxes, for example distillation of the solvent or by steam stripping of the solvent.

The waxes produced contain only small amounts of titanium and because of this, they generally do not require any purification treatment for the purpose of removing the catalytic residues.

The atactic waxes produced in accordance with the method of the invention occur in the form of plastic, homogenous and white substances. Their specific weight is from 0.85 to 0.90 g/ccm at 20° C. Their pasty melting point is from 90° to 135° C. The fraction of these waxes which is extracted by boiling n-heptane is in general virtually 100%; in any event, it is always higher than 95%. Their degree of crystallinity, as determined by infra-red spectroscopy is generally less than 15% and in most cases does not exceed 10%. Their molecular weight is from 10,000 to 200,000; it is frequently close to 50,000.

Because of their properties, these atactic waxes can be used in various industrial applications, in particular in the production of adhesives.

Having described the basic concepts of the invention, reference is now made to the following Examples which are given by way of illustration, and not of limitation, of the practice of the invention in the preparation of the catalyst and the use of the catalyst in the polymerization of olefins.

EXAMPLES 1 to 4 a. Pre-activation of the catalyst.

Operation is in a stainless steel reaction vessel having a capacity of 1 liter and provided with a mechanical stirrer, and a device for heating or cooling by means of a double jacket.

The reaction vessel is purged with nitrogen and then 500 ml of n-heptane together with the amounts of magnesium in powder form and titanium trichloride shown in Table I, are introduced into the reaction vessel at ambient temperature and with stirring. A little ethoxyethane and an iodine crystal to activate the magnesium are also introduced into the reaction vessel.

After the contents of the reaction vessel have been heated to 90° C, the amount of ethyl chloride shown in table I is introduced progressively into the reaction vessel, in a nitrogen atmosphere. It is observed that a large amount of heat is given off, which is controlled by cooling the reaction medium.

Stirring of the medium is then continued for two hours 30 minutes at a temperature of 70° C. The catalyst which is pre-activated in this way is washed several times with n-heptane until virtually all the ethyl chloride in the washing solvent disappears.

b. Polymerization of ethylene.

Operation is in a stainless steel reaction vessel having a capacity of 5 liters and provided with a mechanical stirrer and a device for heating or cooling by means of a double jacket. After the reaction vessel has been purged with nitrogen, the following are successively introduced under a nitrogen atmosphere:
- 2 liters of n-heptane.
- 0.8 g (4 millimoles) of triisobutylaluminum,
- an amount of the catalyst pre-activated in step a) above, corresponding to 1 milligram atom of titanium.

The contents of the reaction vessel are heated to 80° C and hydrogen is introduced thereinto until the pressure reaches three bars, followed by ethylene at a flow rate of 160 g per hour. After 6 hours 30 minutes of polymerization at a total pressure of less than 5 bars, the operation is stopped and the polymer formed is isolated. In the four tests, approximately 1000 g of a polyethylene containing approximately 50 parts by weight per million (p.p.m.) of titanium is produced. The fluidity index of the four portions of polymer produced is from 1 to 1.5 at 190° C and under a load of 5 kg.

By way of comparison, an operation for polymerizing ethylene is carried out under the same conditions as those described above, except that the catalyst used comprises non-pre-activated titanium trichloride. It is found necessary to increase the pressure beyond 7 bars in order to produce a substantially equivalent amount of polyethylene for the same duration of polymerization.

TABLE I

| Example | Mg Gram-atoms (grams) | Ti Cl$_3$[a] Moles (grams) | C$_2$H$_5$Cl Moles (grams) |
|---|---|---|---|
| 1[b] | 0.5 (12) | 0.5 (77.2) | 0.5 (32.2) |
| 2 | 1 (24) | 0.5 (77.2) | 1 (64.5) |
| 3 | 1 (24) | 0.5 (77.2) | 1.5 (96.7) |
| 4 | 1 (24) | 0.5 (77.2) | 2 (129) |

[a]Ti Cl$_3$ produced by reducing Ti Cl$_4$ by means of an organoaluminic compound.
[b]The pre-activated catalyst produced has the following compositon by weight:
Ti : 19.7% Mg : 10.2% Cl : 58.3% organic residues: 12%

EXAMPLES 5 to 7 a. Pre-activation of the catalyst.

Operation is as in Examples 1 to 4, except that ethyl chloride is replaced by n-butyl chloride. The amounts of reactants used are shown in table II.

b. Polymerization of ethylene. Operation is as in Examples 1 to 4, b).

Approximately 1000g of a polyethylene containing approximately 50 ppm of titanium is produced in the three tests.

TABLE II

| Example | Mg Gram-atoms (grams) | Ti Cl$_3$ Moles (grams) | n.C$_4$H$_9$Cl Moles (grams) |
|---|---|---|---|
| 5 | 0.5 (12) | 0.5 (77.2) | 0.5 (46.2) |
| 6[c] | 0.5 (12) | 0.5 (77.2) | 0.5 (46.2) |
| 7 | 1 (24) | 0.5 (77.2) | 2 (185) |

(c) The catalyst is pre-activated in the absence of ethoxy-ethane.

EXAMPLE 8 a. Pre-activation of the catalyst.

Operation is as in Example 1a), except that the ethoxy-ethane is replaced by a small amount of hexamethylphosphorotriamide.

b. Polymerization of ethylene.

Operation is as in Examples 1 to 4b). 920 g of a polyethylene containing 52 ppm of titanium is produced. Its fluidity index, measured at 190° C and under a load of 5 kg, is 1.2.

EXAMPLES 9 to 12 a. Pre-activation of the catalyst.

Operation is under the same conditions as in Examples 1 to 4a), except that titanium trichloride is replaced by a titanium compound having the mean formula $TiCl_{2.5}(OC_3H_7)_{0.5}$ produced by the reduction, by means of an organo-aluminic compound, of the product of a functional interchange reaction between titanium tetrachloride and n-propyl titanate. The nature and the amounts of the reactants used in the preactivation operation appear in Table III.

b. Polymerization of ethylene.

Operation is as in Examples 1 to 4b), except that triisobutylaluminum is replaced by 1.44 g (12 millimoles) of diethylaluminumchloride, and that the hydrogen pressure is 3.5 bars instead of 3 bars.

In all the tests approximately 1000 g of a polyethylene containing approximately 50 ppm of titanium is produced. The four portions of polymer produced have a fluidity index measured at 190° C and under a load of 2.16 kg, of from 5 to 7.5.

By way of comparison, ethylene is polymerized under the same conditions as those described above, except that the catalyst, having the mean formula $TiCl_{2.5}(OC_3H_7)_{0.5}$ is not pre-activated. Even when the ethylene pressure is raised to 12 bars, it is found that polymerization does not begin.

TABLE III

| Example | Mg Gram-atoms (grams) | Ti Cl$_{2.5}$-(O C$_3$H$_7$)$_{0.5}$ Moles (grams) | C$_2$H$_5$Cl Moles (grams) | n.C$_4$H$_9$Cl Moles (grams) |
|---|---|---|---|---|
| 9 | 0.5 (12) | 0.5 (83.1) | 0.5 (32.2) | 0 |
| 10 | 0.5 (12) | 0.5 (83.1) | 1.5 (96.7) | 0 |
| 11 | 0.5 (12) | 0.5 (83.1) | 0 | 0.5 (46.2) |
| 12 | 1 (24) | 0.5 (83.1) | 0 | 0.5 (46.2) |

EXAMPLE 13 a. Pre-activated of the catalyst.

Operation is as in Example 9a) except that ethoxy-ethane is replaced by a small amount of tetrahydrofuran, acting as a magnesium depassivating agent.

b. Polymerization of ethylene.

Two liters of n-heptane are introduced at ambient temperature into a stainless steel 5-liter reaction vessel provided with a mechanical stirrer and a device for heating or cooling by means of a double jacket, which has first been purged with nitrogen. After the n-heptane has been heated to 80° C, the following are introduced:
- 3.4 g (28 millimoles) of diethylaluminumchloride,
- an amount of catalyst pre-activated in step a), corresponding to 14 milligram-atoms of titanium.

The reaction mixture is maintained at a temperature of 80° C and hydrogen is introduced until the pressure is 6 bars, followed by ethylene at a flow rate of 100 g/hour. After 5 hours of reaction, the polymer formed is drained; it is then subjected to two successive extraction steps using two liters of boiling n-heptane for each step, followed by extraction with two liters of n-heptane at ambient temperature. After each extraction step, the polymer is separated from the solvent by decantation; it is then dispersed in 500 ml of n-heptane in which 7 g (35 millimoles) of tri-n-octyl-aluminum has been dissolved, then the solvent is evaporated. 470 g of a dry polymer, called a pre-polymer, containing 1430 ppm of titanium, is produced.

20 g of this pre-polymer is introduced into a fluidized bed reaction vessel comprising a stainless steel tube which is 10 cm in diameter and which is provided at its lower end with a porous plate having pores whose mean diameter is 40 microns. The reaction vessel is also provided with a heating device. The reaction vessel is heated to 100° C, and the pre-polymer is fluidized by means of a gaseous flow rising at a rate of 10 cm/sec and comprising a mixture of 60% by volume of ethylene and 40% by volume of hydrogen at a pressure of 20 bars. The gas issuing from the reaction vessel is cooled in an external cooling means and then it is recycled to the fluidized bed reaction vessel by means of a compressor. After polymerization for 2 hours, there is collected 950 g of a polyethylene having a fluidity index (measured under a load of 2.16 kg and at a temperature of 190° C) of 5.5, an apparent volumic weight of 0.46 g/ccm, a mean granulometry of 600 microns and containing 30 parts by weight per million (ppm) of titanium.

EXAMPLE 14 a. Pre-activation of the catalyst.

The following are successively introduced, under a nitrogen atmosphere, into a stainless steel 5-liter reaction vessel provided with a mechanical stirrer and a device for heating or cooling by circulating a fluid in a double jacket:
- 19.2 g (800 mM) of powder magnesium,
- 61.7 g (400 mM) of a titanium trichloride produced by reducing titanium tetrachloride by means of an organo-aluminic compound,
- an ionide crystal,
- 24 ml (800 mM) of ethoxy-ethane,
- some dry n-heptane until the volume is 800 ml.

The mixture is raised to a temperature of 75° C. The reaction vessel is then closed and 84 ml (1200 mM) of ethylchloride is introduced over a period of about 2 hours. The reaction medium is then maintained at 70° C for 2 hours 30 minutes.

The catalyst which is pre-activated in this way is washed several times with n-heptane until virtually all the ethylchloride in the washing solvent has disappeared.

b. Polymerization of the propylene.

A stainless steel 5-liter reaction vessel of the same type as that described in a) is purged by means of nitrogen; 2 liters of n-heptane, 1.2 g (10 mM) of diethylaluminumchloride and 1.34 g of the pre-activated catalyst prepared in a), corresponding to 4 -milligram-atoms of titanium, and then introduced into the reaction vessel in a stream of nitrogen. The reaction medium is raised to a temperature of 70° C and then hydrogen is introduced thereinto until the pressure is 2 bars, followed by gaseous propylene so as to maintain a pressure of 5 bars in the reaction vessel, over a period of 6 hours. After drawing off by simply running out the solution and evaporating the solvent, 600 g of an atactic wax is collected which is 96% soluble in boiling n-heptane and has a mean molecular weight of 50,000.

EXAMPLE 15

Polymerization of a mixture of propylene and ethylene.

The pre-activated catalyst prepared as in Example 14 a) is used.

Operation is as in Example 14 b), with:

- 2 liters of n-heptane,
- 1.2 g (10 mM) of diethylaluminumchloride,
- 1.34 g (4 milligram-atoms of titanium) of the preactivated catalyst.

Hydrogen is then introduced into the reaction vessel until the pressure is 2 bars, followed by a mixture of 72.5% by volume of propylene and 27.5 % by volume of ethylene, with the pressure in the reaction vessel being maintained at 7 bars for 6 hours. After drawing off the polymer produced, by simply running out the solution and evaporating the solvent, 610 g of an atactic wax which is 100% soluble in boiling n-heptane is collected. Its mean molecular weight is 28,000.

EXAMPLE 16

Polymerization of a mixture of propylene and n-butene-1.

Operation is as in Example 15, with a mixture of olefins which comprises 94% by volume of propylene and 6% by volume of n-butene-1. After 6 hours of polymerization, 200 g of a wax is collected which is soluble 95% by weight in boiling n-heptane and which has a mean molecular weight of 17,000.

We claim:

1. In a method for polymerizing olefins at low pressures, the improvement comprising contacting the olefin with a catalyst comprising (1) a solid compound of a trivalent titanium compound, with the trivalent titanium compound being subjected before polymerization to a pre-activation treatment by being brought into contact simultaneously with magnesium and one or more alkyl halides, the transition metal compound remaining in the solid state when contacted with the magnesium and alkyl halides and (2) one or more organo-metallic compounds of Groups II and III of the Periodic Table of elements.

2. A method as claimed in 1 wherein the trivalent titanium compound is a compound of trivalent titanium corresponding to the formula $Ti(OR)_mX_{3-m}$, wherein R represents an alkyl radical which contains from 2 to 8 carbon atoms, X represents a halogen atom, and $m$ represents an integer or a fraction which can be of from 0 to 3.

3. A method as claimed in 2 wherein the trivalent titanium compound is produced by the reduction, by means of organo-aluminic compounds, of a compound having the formla $Ti(OR)_pX_{4-p}$, wherein R represents an alkyl radical which can contain from 2 to 8 carbon atoms, X represents a halogen atom, generally chlorine, and $p$ is an integer or a fraction which can be of any value from 0 to 4.

4. A method as claimed in 1 wherein the mono-halogenated hydrocarbons are selected from compounds corresponding to the formula $CyH_{2y+1}X$, in which formula X represents a chloride or bromine atom and $y$ is an integer of from 1 to 12.

5. A method as claimed in 1 wherein pre-activation is effected in an inert organic solvent and at a temperature within the range of $-20°$ to $150°$ C.

6. A method as claimed in 1 wherein pre-activation of the solid transition metal compound is carried out with relative amounts of the reactants such that the ratio between the number of mono-halogenated hydrocarbon molecules and the number of magnesium atoms is from 0.5 to 10 and the ratio between the number of molecules of the solid transition metal compound and the number of magnesium atoms is from 0.1 to 10.

7. A method as claimed in 1 wherein the magnesium is subjected, before or during pre-activation, to treatment by means of a compound selected from the group consisting of iodine, alcoholates of metals of sub-groups Ia, IIa and IIIa of the Periodic Table of elements, alkyl titanates, ethers and mixtures thereof.

8. A method as claimed in 1 wherein the duration of the pre-activation treatment is from 30 minutes to 3 hours.

9. A method as claimed in claim 1 wherein the organo-metallic co-catalyst is an organo-aluminic compound corresponding to the mean formula $AlR_nX_{3-n}$ wherein R represents an alkyl group containing from 2 to 8 carbon atoms, which alkyl group can be partly substituted by hydrogen, X represents a halogen, and $n$ represents an integer or a fraction which can be of any value from 1 to 3.

10. A method as claimed in claim 1 wherein the polymerization is carried out at pressures lower than 25 bars, of olefins having the formula $CH_2=CHR$ in which R is a hydrogen atom or an alkyl radical which contains a maximum of 8 carbon atoms.

11. A method as claimed in claim 1 wherein the olefin is ethylene or ethylene with other alpha-olefins, and the polymerization is carried out at pressures lower than 25 bars.

12. A method as claimed in claim 1 wherein the olefin is propylene, to which there may be added one or more other olefins having the formula $CH_2=CHR'$ in which R' is hydrogen or an alkyl radical containing from 2 to 8 carbon atoms, polymerization being effected at a pressure less than 25 bars in the presence of a catalytic system comprising a compound of trivalent titanium having the formula $Ti(OR)_mX_{3-m}$ in which R represents an alkyl radical which can contain from 2 to 8 carbon atoms, X represents a halogen atom, and $m$ represents a fraction which can be of any value from 0 to 0.5, which trivalent titanium compound is subjected before polymerization to a pre-activation treatment by being brought into contact simultaneously with magnesium and one or more alkyl halides, and one or more organo-metallic compounds of metals of Groups II and III of the Periodic Table of elements.

13. A method as claimed in claim 12 wherein the trivalent titanium compound subjected to pre-activation comprises a titanium trihalide.

14. A method as claimed in claim 12 wherein polymerization is effected in the presence of hydrogen, the molecular proportions of the hydrogen present in the reaction medium being from 5% to 80% of the olefins to be polymerized.

15. As new industrial products, polyolefins prepared in accordance with the method as claimed in claim 1.

16. As new industrial products, the atactic waxes produced in accordance with the method as claimed in 12, in the form of plastic, homogeneous and white substances which have a specific gravity of from 0.85 to 0.90 g/ccm at 20° C, a melting point of from 90° to 135° C, a degree of crystallinity as determined by infra-red ray spectroscopy of lower than 15%, and being such that the fraction extracted by boiling n-heptane is greater than 95%.

17. In a method for the polymerization of olefins at low pressures, the improvement comprising contacting the olefin with a catalyst comprising (1) a solid compound of trivalent titanium having the formula $$Ti(OR)_mX_{3-m}$$

where R is $C_2$ to $C_8$ alkyl, X is halogen and $m$ ranges from 0 to 3, said compound having been pretreated for 30 minutes to 3 hours by contacting the compound simultaneously with a halogenated hydrocarbon of the formula $C_yH_{2y+1}X$ where $y$ is an integer from 1 to 12 and X is halogen and finely divided magnesium metal, the titanium compound remaining in the solid state when contacted with the magnesium and halogenated hydrocarbon, and (2) an organoaluminum compound of the formula $$Al\ R'_nX_{3-n}$$

where R' is $C_2$ to $C_8$ alkyl, X is halogen and $n$ ranges from 1 to 3.

18. A method as defined in claim 17 wherein the mole ratio of the halogenated hydrocarbon to magnesium is within the range of 0.5 to 10, and the mole ratio of titanium compound to magnesium is within the range of 0.1 to 10.

* * * * *